United States Patent
Arold

(10) Patent No.: US 9,126,131 B2
(45) Date of Patent: Sep. 8, 2015

(54) AIR FILTER FOR A VENTILATION SYSTEM OF A MOTOR VEHICLE

(75) Inventor: Klaus Arold, Sindelfingen (DE)

(73) Assignee: Daimler AG, Stuttgart (DE)

( * ) Notice: Subject to any disclaimer, the term of this patent is extended or adjusted under 35 U.S.C. 154(b) by 1833 days.

(21) Appl. No.: 12/083,494

(22) PCT Filed: Oct. 5, 2006

(86) PCT No.: PCT/EP2006/009619
§ 371 (c)(1),
(2), (4) Date: Aug. 11, 2009

(87) PCT Pub. No.: WO2007/042194
PCT Pub. Date: Apr. 19, 2007

(65) Prior Publication Data
US 2009/0298413 A1    Dec. 3, 2009

(30) Foreign Application Priority Data
Oct. 12, 2005   (DE) .......................... 10 2005 048 841

(51) Int. Cl.
| | |
|---|---|
| *B60H 3/06* | (2006.01) |
| *B60H 1/00* | (2006.01) |
| *B01D 46/10* | (2006.01) |
| *F24F 13/28* | (2006.01) |
| *B01D 46/00* | (2006.01) |

(52) U.S. Cl.
CPC .......... *B01D 46/0005* (2013.01); *B01D 46/002* (2013.01); *B01D 46/0006* (2013.01); *B60H 1/00521* (2013.01); *B60H 3/0616* (2013.01); *B01D 2265/024* (2013.01); *B60H 2003/065* (2013.01)

(58) Field of Classification Search
USPC .......................................... 454/158
See application file for complete search history.

(56) References Cited

U.S. PATENT DOCUMENTS

| | | | |
|---|---|---|---|
| 4,093,119 A | | 6/1978 | Swisher |
| 5,509,950 A | * | 4/1996 | van de Graaf et al. .......... 55/486 |
| 5,611,728 A | * | 3/1997 | Arold ............................ 454/158 |

(Continued)

FOREIGN PATENT DOCUMENTS

| | | |
|---|---|---|
| DE | 42 34 047 C1 | 8/1993 |
| DE | 100 34 487 A1 | 1/2002 |

(Continued)

OTHER PUBLICATIONS

International Search Report dated Dec. 15, 2006 (PCT/ISA/210) with PCT/ISA/220, with English Translation of relevant portion (Seven (7) pages).

(Continued)

*Primary Examiner* — Gregory Huson
*Assistant Examiner* — Eric Gorman
(74) *Attorney, Agent, or Firm* — Crowell & Moring LLP

(57) ABSTRACT

An air filter for a ventilation system of a motor vehicle has a filter frame and a filter medium fastened in and surrounded by the filter frame. The air filter can be inserted along its two-dimensional extent into a receiving slot and is sealed, at least along the inserted regions of the filter frame, between the filter frame and walls of the insertion slot. To allow the filter to be installed in the ventilation system in as force-free and simple a manner as possible, the filter frame has, in the end side facing the insertion direction, at least one guide slot which is oriented in the insertion direction.

8 Claims, 1 Drawing Sheet

(56) References Cited

U.S. PATENT DOCUMENTS

| | | | |
|---|---|---|---|
| 5,613,991 A * | 3/1997 | Esaki et al. | 55/385.3 |
| 6,129,140 A | 10/2000 | Kawahara | |
| 6,387,143 B1 * | 5/2002 | Adiletta | 55/497 |
| 6,598,580 B2 | 7/2003 | Baumann et al. | |
| 6,692,347 B1 * | 2/2004 | Schneider | 454/158 |
| 6,814,660 B1 * | 11/2004 | Cavett | 454/284 |
| 2002/0106310 A1 * | 8/2002 | Zuk, Jr. | 422/102 |
| 2004/0020177 A1 * | 2/2004 | Ota et al. | 55/481 |
| 2004/0072533 A1 * | 4/2004 | Cho | 454/155 |
| 2004/0185767 A1 * | 9/2004 | Schneider | 454/158 |
| 2004/0242059 A1 * | 12/2004 | Aoyama et al. | 439/532 |
| 2005/0044688 A1 * | 3/2005 | Wynn | 29/462 |
| 2005/0051486 A1 * | 3/2005 | Zuk, Jr. | 210/645 |
| 2007/0066215 A1 * | 3/2007 | Song et al. | 454/329 |
| 2008/0035103 A1 * | 2/2008 | Barris et al. | 123/198 E |
| 2008/0168754 A1 * | 7/2008 | Frey et al. | 55/488 |
| 2009/0209190 A1 * | 8/2009 | Gould | 454/158 |
| 2010/0282681 A1 * | 11/2010 | Zuk, Jr. | 210/645 |
| 2013/0067877 A1 * | 3/2013 | Griffiths et al. | 55/499 |
| 2013/0180221 A1 * | 7/2013 | Peteln | 55/481 |
| 2014/0302913 A1 * | 10/2014 | Bichl et al. | 463/25 |

FOREIGN PATENT DOCUMENTS

| | | |
|---|---|---|
| DE | 10 2004 025 274 A1 | 12/2004 |
| DE | 20 2005 013 646 U1 | 12/2005 |
| DE | 102013015630 A1 * | 3/2015 |
| EP | 1 172 240 A2 | 1/2002 |
| JP | 57-117214 A | 7/1982 |
| JP | 8-118948 A | 5/1996 |
| JP | 9-290630 A | 11/1997 |
| JP | 2001-63357 A | 3/2001 |
| KR | 2004079863 A * | 9/2004 |

OTHER PUBLICATIONS

Written Report of the International Search Agency (PCT/ISA/237) with English translation of relevant portion (Seven (7) pages).

German Search Report dated Jul. 24, 2006 with English Translation of relevant portion (Four (4) pages).

* cited by examiner

AIR FILTER FOR A VENTILATION SYSTEM OF A MOTOR VEHICLE

This application is a national stage of International Application No. PCT/EP2006/009619, filed Oct. 5, 2006, which claims priority under 35 U.S.C. §119 to German Patent Application No. 10 2005 048 841.2, filed Oct. 12, 2005, the entire disclosure of which is herein expressly incorporated by reference.

The invention relates to an air filter for a ventilation system of a motor vehicle.

A filter of this type, which is disclosed in German patent document DE 42 34 047 C1, has a filter medium that is fastened in, and surrounded by, a filter frame. For installation in the air duct of the ventilation system, a filter of this type is inserted along its two-dimensional extent into a receiving slot of the ventilation system. In order to guide the air filter as it is inserted in the housing of the air duct, depressions are provided which act as sliding guides and support the air filter in the fitted state, counter to the direction of flow through the air filter. However, if the sliding guides are oriented parallel to one another, it can be expected that a great deal of force will be needed for installation (because of the large contact surfaces provided along the sliding guides with the insertion slot). Accordingly, obliquely converging sliding guides and outer surfaces of the filter frame are provided in the disclosed air filter.

One object of the invention is to provide an air filter which is simple to install and is readily secured in position in the installed state.

This and other objects and advantages are achieved by the air filter according to the invention, which has a filter frame with a filter medium fastened therein, and is insertable along its two-dimensional extent into a receiving slot of a ventilation system. In the inserted, installed state, the filter is sealed, along the inserted portions of the filter frame, between the filter frame and oppositely arranged walls of the insertion slot. To permit insertion of the air filter into the associated insertion slot of the ventilation system with particularly low installation forces, the filter dispenses with specially configured operative surfaces connected to sliding guides of the insertion slot. Rather, the end of the filter frame that faces the insertion direction has at least one guide slot or opening which is oriented in the insertion direction. By inserting the air filter along its two-dimensional extent (i.e., transversely with respect to the direction in which the flow passes through it), little construction space is needed to replace the filter.

When an air filter of this type, is inserted, guide pins which are provided on the housing of the ventilation system in the insertion slot can engage with the guide slot of the filter frame, so that the latter can be guided, upon insertion, in a particularly force-free manner, and fixed in the inserted, fitted installation position. In addition to the air filter being able insertable in a particularly force-free manner, the guide slot (opening or aperture) on the filter frame enables it to be introduced into the insertion slot of the ventilation system in a particularly force free manner, since, depending in each case on the length of an associated guide pin, the air filter is guided only at a very late point (in particular, only in the region of the guide pin,—that is, in the region of the guide frame end facing the insertion direction), and is still movable laterally at the opposite end (i.e., the filter frame end side facing away from the insertion direction). During insertion into an insertion slot of the ventilation system, the air filter can therefore be moved along its two-dimensional extent (for example even along a slight curve), or, for guidance around structural obstacles or edges, can even be moved to a small extent transversely with respect to the two-dimensional extent of the air filter. In particular, an insertion slot leading through lateral depressions prevents mobility of this type, provided it fixes the filter in the fitted position.

Furthermore, by omitting lateral guide depressions on the housing of the ventilation system in the region of the insertion slot, an air filter of this type allows a particularly simple and construction-space-saving configuration of the housing of the ventilation system.

Furthermore, noise generation at associated edges, particularly if an air filter is not fitted in certain equipment variants, is avoided. Since an air filter of this type makes it possible for a guide shoulder on the filter, which encircles the frame and also, because of its large active length, overall has a large covering surface, to be replaced by a guide pin having a relatively small covering, a filter of this type improves the air resistance and reduces the noise generation in the ventilation system.

In order to ensure a predetermined installation position of the air filter in the insertion slot, in a particular embodiment of the air filter, the guide slot in the filter frame end side facing the insertion direction is arranged outside the surface center. This prevents the air filter from being installed in a twisted installation position. If a plurality of insertion slots are provided in the filter end facing the insertion direction, then the insertion slots are to be arranged, with respect to the surface center, asymmetrically with respect to one another, in order to achieve this effect.

To permit a particularly cost-effective and lightweight construction of a filter, the filter medium has a pleated (that is, folded) filter fleece. This also permits a particularly large two-dimensional extent of the filter medium.

In order to avoid damage to the pleated filter medium of the filter by surrounding obstacles or edges as the air filter is inserted into the insertion slot of the ventilation system, in a particular embodiment of the air filter, the pleating of the filter is oriented with the elongated extent of its crease, or of the doubled-over edges, in the insertion direction of the filter. This avoids angular obstacles coming into engagement with the filter medium transversely with respect to the folds of the filter. Furthermore, the guide pin which comes into engagement in the guide slot can be arranged between the folds of the pleating without a special arrangement of the filter medium or filter frame.

In a particular embodiment of the air filter, it is provided that the guide slot is arranged with its full two-dimensional extent along the end facing the insertion direction, that is, transversely with respect to the insertion direction, in a fold of the pleating (i.e., without overlapping with the filter medium) between two layers of the pleated filter medium. This also permits a particularly simple installation of the filter medium in the filter frame, without need of further trimming along the planar filter frame inner regions which surround the guide slot. In the case of an open design of the guide slot, an arrangement of this type i) permits complete sealing of the filter medium along its surrounding fastening in the filter frame, and ii) avoids damage to the filter medium by a guide pin of the associated ventilation system entering the guide slot.

In a particular refinement of the air filter, the guide slot is arranged in the fold of the pleating, in a direction from the opening of the fold toward the base of the fold, upstream of the seal of the filter frame. The guide slot is therefore arranged in the filter frame on both sides of the wall of the filter frame, upstream and downstream of the seal of the air filter. In particular in the case of an open design of the guide slot, a flow circulating around the filter by the filter slot opening past the seal and filter medium is prevented.

In a simplest design, the guide slot is configured as a hole-like aperture in the filter frame. An associated guide pin of the ventilation system can bear against said hole-like aperture of the filter frame in a manner supporting the filter at least in and counter to the direction in which the flow passes through it, but in particular on all sides.

In this case, the hole-like aperture can be formed by a corresponding indentation on the filter frame. Alternatively, it can be bounded in a completely surrounding manner by the filter frame.

In order to form a secure sealing of the air filter, one embodiment of the air filter has a guide slot which is formed by a trough-like depression in the filter frame. As a result, a flow circulating around the air filter through a hole-like aperture is avoided.

Other objects, advantages and novel features of the present invention will become apparent from the following detailed description of the invention when considered in conjunction with the accompanying drawings.

DETAILED DESCRIPTION OF THE DRAWINGS

Figure 1:
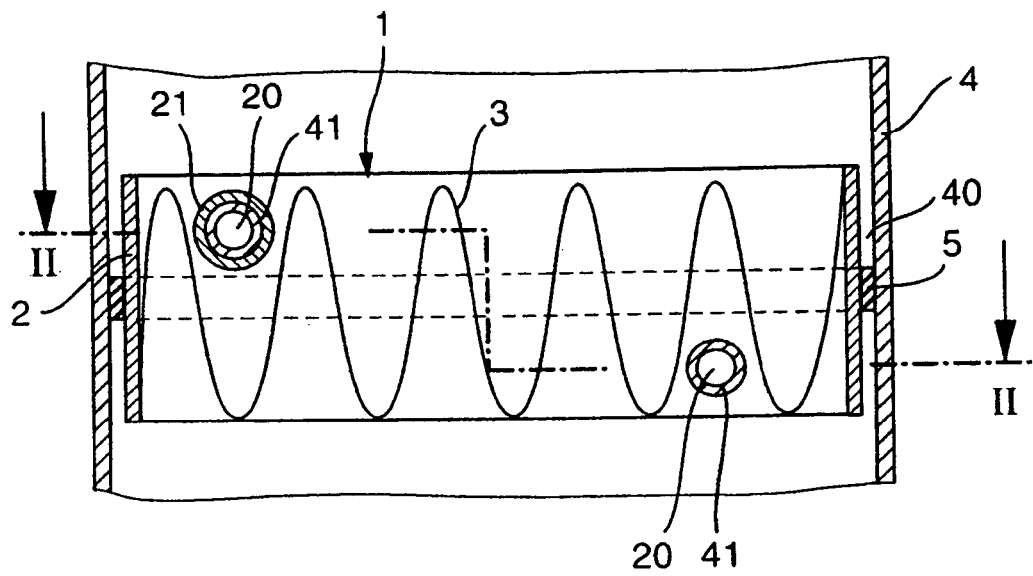
FIG. 1 is a sectional illustration through an embodiment of the filter, with the section plane transverse to the insertion direction.

FIG. 1 is a sectional view of an air filter 1 installed in a ventilation system (of which only a portion of the air duct 4 passed through by the air filter 1 is illustrated). The section plane on which the illustration is based transversely to the two-dimensional extent of the air filter 1 and parallel to the insertion opening of the insertion slot 40 of the ventilation system 4. The viewing direction is therefore directed away from the insertion opening in the insertion slot 40 in the direction of insertion of the air filter 1 into the insertion slot 40.

The air filter 1 has an air filter frame 2 which can be manufactured, for example, of a textile or cardboard material or else in the form of an injection molded plastic part. A filter medium 3 in the form of a pleated filter fleece is fastened in the frame 2 of the air filter in a completely surrounding (and therefore tight) manner along the inside of the walls forming the air filter frame 2. The pleating of the filter medium 3 is oriented with the doubled-over edges of the pleating extending in the insertion direction. Between the filter frame 2 and the surrounding housing of the ventilation system 4, the air filter 1 is sealed by means of a seal 5 which surrounds the inserted region. In the region through which the air filter 1 passes, the housing of the ventilation system has an insertion slot 40, the walls of which have an edge-free profile which is essentially continuous with the air duct walls mounted upstream and downstream in the direction through which the flow passes. If the installation of an air filter is omitted, for example within the context of equipment variants, no housing edges which generate noise or air resistance are provided in the air duct of the ventilation system 4.

The air filter 1 (which is shown in the installed state) has, in the end wall of the filter frame 2, which wall lies toward the front in the insertion direction, guide slots 20 which are illustrated in two different configurations in the exemplary embodiment shown. The guide slots 20 each have a circular cross section into which a round guide pin 41 of the housing of the ventilation system 4 enters. Because of the small frictional surfaces of a guide of this type, as the air filter 1 is inserted into the insertion slot 40 of the ventilation system, it is guided in a particularly force-free manner and is securely fixed in the installed state. In the cross-sectional area of the air filter 1 (FIG. 1), transversely with respect to the insertion direction, the two guide slots 20 of the air filter 1 are arranged eccentrically and asymmetrically with respect to the associated surface center. Therefore the air filter 1 with the insertion slots 20 can only be pushed onto and fitted to the associated guide pins 41 of the housing of the ventilation system 4, at only one installation point.

Figure 2:
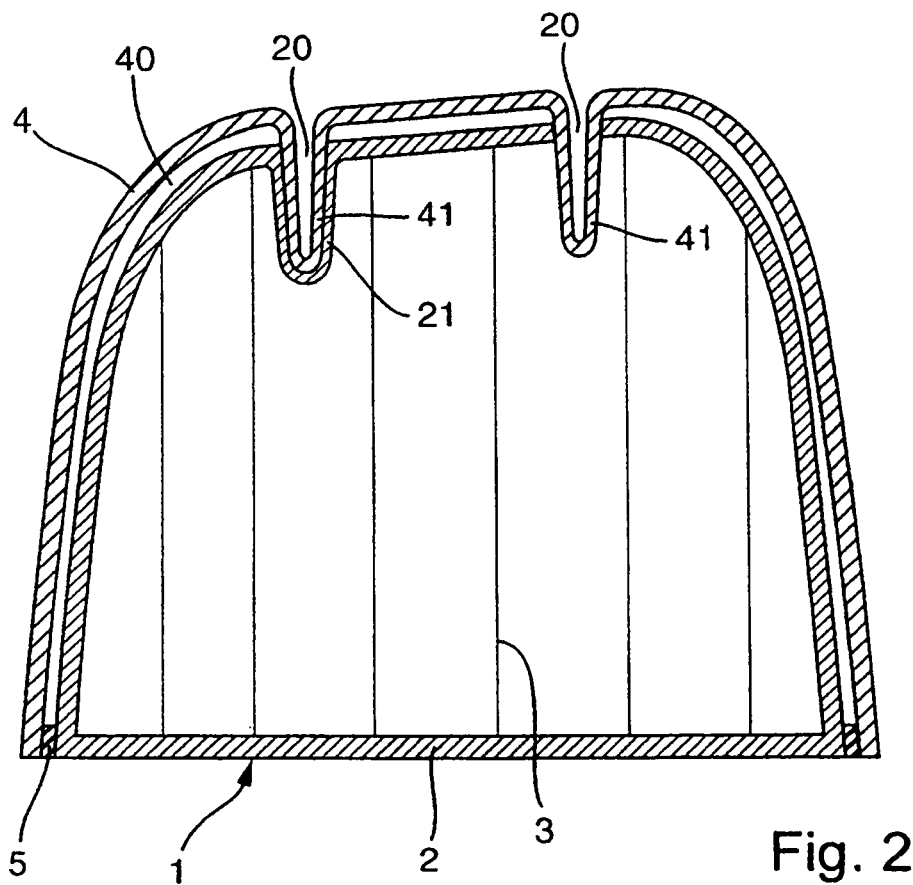
FIG. 2 is a sectional illustration of said embodiment corresponding to the section II-II from FIG. 1.

In the installed state, the air filter 1 is supported on the guide pins 41 of the housing of the ventilation system 4 via the guide slots 20, in particular in and counter to the direction in which the flow passes through it. As shown in FIGS. 1 and 2, the two guide slots 20 of the filter frame 2 differ in design.

One of the insertion slots is bounded by a trough-like depression provided on the guide frame 2. Given an appropriate thickness of the filter frame 2 and short elongate extent of the guide pin 41 in the insertion direction, the depression can be arranged in the thickness extent of said filter frame. In the exemplary embodiment illustrated, the guide slot 20 is bounded by a dome-shaped raised portion of the filter frame, which can be provided by means of an adhesive part attached to the filter frame 2 or on the wall there of the filter frame 2 during shaping production of the guide frame 2.

The other receiving slot 20 is bounded by a hole-like aperture of the filter frame 2, formed by a circular cutout of the filter frame 2.

The guide slots 20 of the guide frame 2 are arranged with their full two-dimensional extent in a fold of the pleated filter medium 3. As a result, the filter medium 3 can be fastened in a particularly simple, surrounding, and tight manner to the inside of the walls forming the filter frame 2 past the elements 21 of the guide frame 2 that bound the guide slot 20 and passed the hole-like opening bounding the guide slot 20. In this case, the guide slots 20 are furthermore arranged within the fold of the pleating, in a direction from the opening of the fold toward the base of the fold, with their full two-dimensional extent along the wall of the filter frame 2, upstream of the seal 5 of the air filter 1. Therefore both the outside opening of the guide slot 20, (i.e., the opening which faces the walls of the housing of the ventilation system) and an inside opening (i.e., an opening which is provided in the case of an open design of the guide slot 20 and is arranged on that side of the guide frame which faces the filter medium) are arranged on the same side upstream or downstream, of both the filter and the seal, relative to the direction in which the flow passes through the air filter. As a result, a flow circulating around the filter via the opening of the guide slot 20 is avoided.

FIG. 2 shows the section II-II from FIG. 1. As in FIG. 1, the air filter 1 is shown in the installed installation position in the housing of the ventilation system 4. In this case, the air filter 1, with its filter frame 2 (in which the pleated filter medium 3 is fastened) is inserted into the receiving slot 40 of the housing of the ventilation system 4, in such a manner that it is sealed along the opposite walls of the insertion slot 40 in a surrounding manner via a seal 5. (In the section shown, the subregions of the seal which seal along the insertion opening of the insertion slot 40 are illustrated.) The air filter 1 therefore passes in a manner sealed at the edges through the full flow cross section of the air duct of the ventilation system 4.

On the end of the filter frame 2 which faces the insertion direction of the air filter, the air filter 1 has two guide slots 20 of which (in order to illustrate different embodiments in the exemplary embodiment shown) one guide slot 20 is bounded by a trough-shaped depression 21 formed in the filter frame 2, and one guide slot 20 is bounded by a hole-like aperture 20 in the filter frame 2. The guide slot 20 which is bounded by the hole-like aperture permits a particularly cost-effective and simple design of the air filter 1. A projection arranged on the wall of the housing of the ventilation system 4 projects into the two guide slots 20 in or through the insertion slot 20 along the pleating of the filter medium 3 that is arranged in the insertion direction. In this case, the guide pins 41 project into the through-flow cross section of the filter. As a result, firstly a compact and space-saving configuration of the components is achieved, and, secondly, the filter medium 3 is protected against damage by means of the guide elements of the housing of the ventilation system 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An air filter for a ventilation system of a motor vehicle, said air filter comprising:
    a filter frame that includes a first end that faces an insertion direction of the air filter, a second end on an opposite side of the filter frame from the first end, and two sides connecting the first and second ends of the filter frame; and
    a filter medium fastened in and surrounded by the filter frame; wherein,
    the filter is insertable along a two-dimensional extent thereof, into an insertion slot, whereby it is sealed, at least along inserted regions of the filter frame, between the filter frame and walls of the insertion slot;
    the first end of the filter frame that faces the insertion direction has at least one installation guide aperture which is oriented in the insertion direction;
    the at least one installation guide aperture is configured to engage with a guide pin of the ventilation system when the air filter is installed in the ventilation system and the at least one installation guide aperture is configured to be open when the air filter is not installed in the ventilation system; and
    the at least one installation guide aperture is arranged in the first end facing the insertion direction so that the at least one installation guide aperture is not located in the center of the first end and is not located in the two sides connecting the first and second ends.

2. The air filter as claimed in claim 1, wherein the filter medium has a pleated filter fleece.

3. The air filter as claimed in claim 2, wherein the pleating of the filter is oriented along an insertion direction.

4. An air filter for a ventilation system of a motor vehicle, said air filter comprising:
    a filter frame that includes a first end that faces an insertion direction of the air filter, a second end on an opposite side of the filter frame from the first end, and two sides connecting the first and second ends of the filter frame; and
    a filter medium fastened in and surrounded by the filter frame; wherein,
    the filter is insertable along a two-dimensional extent thereof, into an insertion slot, whereby it is sealed, at least along inserted regions of the filter frame, between the filter flame and walls of the insertion slot;
    the first end of the filter flame that faces the insertion direction has at least one installation guide aperture which is oriented in the insertion direction;
    a pleating of the filter is oriented along an insertion direction, wherein the installation guide aperture is arranged with its full two-dimensional extent transversely with respect to the insertion direction, in a fold of the pleating;
    the at least one installation guide aperture is configured to engage with a guide pin of the ventilation system when the air filter is installed in the ventilation system and the at least one installation guide aperture is configured to be open when the air filter is not installed in the ventilation system, and
    the at least one installation guide aperture is arranged in the first end facing the insertion direction so that the at least one installation guide aperture is not located in the center of the first end and is not located in the two sides connecting the first and second ends.

5. The air filter as claimed in claim 4, wherein the installation guide aperture is positioned in the fold of the pleating in a direction from an opening of the fold toward a base of the fold, upstream of the seal of the filter frame.

6. The air filter as claimed in claim 1, wherein the installation guide aperture comprises a hole-like aperture in the filter frame.

7. The air filter as claimed in claim 1, wherein the installation guide aperture comprises as a trough-shaped depression in the filter frame.

8. An air filter for a vehicle ventilation system, said air filter comprising:
    a filter medium;
    a filter frame which forms a perimeter of said filter, and to which said filter medium is fixed along said perimeter, wherein,
    the filter frame includes first end that faces an insertion direction of the air filter, a second end on an opposite side of the filter frame from the first end, and two sides connecting the first and second ends of the filter frame; and
    said perimeter of said filter conforms to a contour of an interior of an air flow passage into which said filter is insertable, in the insertion direction, relative to said insertion direction;
    the first end of the filter frame that faces the insertion direction has at least one installation guide aperture therein, said installation guide aperture having a shape and location such as to engage with at least one correspondingly shaped and located projection on a wall of the interior of the air flow passage when the air filter is installed in the ventilation system, which at least one projection extends in a direction opposed to said insertion direction;
    in an inserted state, said filter frame is held against movement along an air flow direction, by engagement of said at least one projection into said at least one installation guide aperture;
    when the air filter is not inserted into the ventilation system the at least one installation guide aperture is open; and
    the at least one installation guide aperture is arranged in the first end facing the insertion direction so that the at least one installation guide aperture is not located in the center of the first end and is not located in the two sides connecting the first and second ends.

* * * * *